Patented Nov. 28, 1922.

1,437,027

UNITED STATES PATENT OFFICE.

ARTHUR P. TANBERG, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF PRODUCING TETRA-SUBSTITUTED UREAS.

No Drawing. Application filed September 11, 1918. Serial No. 253,564.

*To all whom it may concern:*

Be it known that I, ARTHUR P. TANBERG, of Wilmington, in the county of New Castle and in the State of Delaware, have invented a certain new and useful Improvement in Processes of Producing Tetra-Substituted Ureas; and do hereby declare that the following is a full, clear, and exact description thereof.

This invention relates to a process of making tetra-substituted ureas by the action of carbonyl chloride on a secondary amine dissolved in a suitable organic solvent, and it pertains especially to such a process wherein the reaction is carried out in the presence of a suitable basic material which will combine with the hydrogen chloride which is liberated as a result of the reaction between the carbonyl chloride and the secondary amine. More specifically, the new process comprises treating with carbonyl chloride a secondary aromatic amine, such as methylaniline, dissolved in a liquid aromatic hydrocarbon, such as benzene, in the presence of another basic material, such as a tertiary amine.

It has been found that in treating a secondary amine, such as methylaniline, dissolved in benzene, with carbonyl chloride to form a tetra-substituted urea, only 50% of the methylaniline is converted into the urea, the remaining 50% combining with the hydrogen chloride which is liberated to form methylaniline hydrochloride which is incapable of reacting with carbonyl chloride.

As is well known, it is a difficult matter to convert aniline into monomethylaniline without effecting a simultaneous conversion of part of the aniline (or part of the monomethylaniline) into dimethylaniline. In most of the methods for the preparation of monomethylaniline, therefore, it is necessary to prepare a mixture of monomethylaniline and dimethylaniline which must subsequently be resolved into its constituents by chemical processes. Since it was found that dimethylaniline does not react appreciably with carbonyl chloride under the conditions of the process, it was found possible by adjusting the conditions of methylation of aniline to obtain a mixture of monomethylaniline and dimethylaniline (together with small amounts of aniline) of such composition that the monomethylaniline could be practically completely converted into dimethyldiphenylurea, since the mixture contained sufficient dimethylaniline to combine with all the HCl formed in the reaction. This dimethylaniline can, of course, be subsequently recovered.

One object of my invention is to provide a process whereby substantially all of the secondary amine which is used may be converted into a tetra-substituted urea.

Another object of my invention is to avoid the necessity of isolating methylaniline in pure form in a process in which methylaniline is to be converted into dimethyldiphenylurea.

Although the proportions of the materials used and the conditions under which the process is carried out are capable of wide variation, my invention may be illustrated by the following specific example.

A mixture of 100 parts of monomethylaniline and 112 parts of dimethylaniline is dissolved in 100 parts of benzene and warmed to about 60° C. Carbonyl chloride in the form of a gas is then passed into the solution until all evidence of reaction has ceased. The benzene is then distilled off and the residue is treated with dilute HCl for the complete removal of the dimethylaniline. The dimethyldiphenylurea is insoluble in the dilute acid, and may therefore be filtered off and washed free from acid with water. In order to complete the purification the product may be crystallized from a suitable solvent.

The dimethylaniline may be substituted by any suitable basic material, "suitable basic material" being interpreted to mean a material which will dissolve in the solvent used, will combine with the HCl formed in the reaction, and will not react appreciably with carbonyl chloride under the conditions of the process. Instead of benzene, any suitable organic solvent may be used, "suitable organic solvent" being interpreted to mean one which does not react with carbonyl chloride under the conditions of the process, such as carbon tetrachloride, toluene, xylene, solvent naphtha, etc. As it is desired to avoid a reaction (condensation) between the secondary amine and the basic material, other substances tending to promote such reaction are excluded.

I claim:—

1. The process of producing tetra-substituted ureas which comprises treating with carbonyl chloride in the presence of a basic material a secondary amine dissolved in an inert organic solvent, said secondary amine having its amino group attached to two hydrocarbon radicals, and said basic material being soluble in the solvent used, and capable of combining with the hydrogen chloride formed during the reaction.

2. The process of producing tetra-substituted ureas which comprises treating a secondary amine dissolved in an inert organic solvent with carbonyl chloride in the presence of a basic material and in the absence of other substances capable of promoting a reaction between the basic material and the secondary amine, said basic material being soluble in the solvent used and capable of combining with the hydrogen chloride formed during the reaction.

3. The process of producing tetra-substituted ureas which comprises treating with carbonyl chloride in the presence of a basic material a secondary amine dissolved in a liquid aromatic hydrocarbon, said secondary amine having its amino group attached to two hydrocarbon radicals, and said basic material being soluble in the solvent used, and capable of combining with the hydrogen chloride formed during the reaction.

4. The process of producing tetra-substituted ureas which comprises treating with carbonyl chloride in the presence of a basic material a secondary aromatic amine dissolved in a liquid aromatic hydrocarbon, said secondary amine having its amino group attached to two hydrocarbon radicals, and said basic material being soluble in the solvent used, and capable of combining with the hydrogen chloride formed during the reaction, and being present in sufficient quantity to combine with substantially all of the hydrogen chloride formed during the reaction.

5. The process of producing dimethyldiphenylurea which comprises passing carbonyl chloride into a solution of methylaniline and another basic material in an inert organic solvent, said basic material being soluble in said solvent and capable of combining with the hydrogen chloride formed during the reaction.

6. The process of producing dimethyldiphenylurea which comprises passing carbonyl chloride into a benzene solution of methylaniline and another basic material which will dissolve in the solvent used, will combine with the hydrogen chloride formed in the reaction and will not react appreciably with carbonyl chloride under the conditions prevailing during the process, the reaction being carried out at an elevated temperature.

7. The process of producing tetra-substituted ureas which comprises inducing a reaction between carbonyl chloride and a secondary amine in the presence of a sufficient quantity of a tertiary amine to react with substantially all the hydrogen chloride formed during the reaction, the reaction being brought about in the presence of an inert organic solvent for the amines, and in the absence of other substances tending to promote a reaction between said amines.

8. The process of producing tetra-substituted ureas which comprises treating about equal molecular proportions of a secondary and tertiary amine dissolved in a liquid aromatic hydrocarbon with carbonyl chloride until the secondary amine has been converted into a terta-substituted urea, and separating the resulting urea from the tertiary amine hydrochloride which is formed.

9. The process of producing tetra-substituted ureas which comprises treating about equal molecular proportions of a secondary aromatic amine and a tertiary amine dissolved in a liquid aromatic hydrocarbon with carbonyl chloride until the secondary amine has been converted into a tetra-substituted urea, and separating the resulting urea from the tertiary amine hydrochloride which is formed.

10. The process of producing tetra-substituted ureas which comprises treating about equal molecular proportions of a secondary aromatic amine and a tertiary amine dissolved in benzene with carbonyl chloride until the secondary amine has been converted into a tetra-substituted urea, and separating the resulting urea from the tertiary amine hydrochloride which is formed.

11. The process of producing tetra-substituted ureas which comprises treating about equal molecular proportions of an alkylarylamine and a tertiary amine dissolved in benzine with carbonyl chloride until the secondary amine has been converted into a tetra-substituted urea, and separating the resulting urea from the tertiary amine hydrochloride which is formed.

12. The process of producing dialkyldiarylureas which comprises treating with carbonyl chloride an alkylarylamine, dissolved in an inert organic solvent, in the presence of a sufficient quantity of a dialkylarylamine to combine with substantially all of the hydrogen chloride formed in the reaction.

13. The process of producing dialkyldiarylureas which comprises treating with carbonyl chloride an alkylarylamine, dissolved in an inert organic solvent, in the presence of a sufficient quantity of a dialkylarylamine to combine with substantially all of the hydrogen chloride formed in the reaction, and maintaining the reaction mixture at a temperature of about 60° C.

14. The process of producing dialkyldiarylureas which comprises treating with carbonyl chloride an alkylarylamine, dissolved in a liquid aromatic hydrocarbon, in the presence of a sufficient quantity of a dialkylarylamine to combine with substantially all of the hydrogen chloride formed in the reaction.

15. The process of producing dimethyldiphenylurea which comprises treating with carbonyl chloride about equal molecular proportions of methylaniline and dimethylaniline dissolved in an inert organic solvent.

16. The process of producing dimethyldiphenylurea which comprises treating with carbonyl chloride about equal molecular proportions of methylaniline and dimethylaniline dissolved in a liquid aromatic hydrocarbon.

17. The process of producing dimethyldiphenylurea which comprises treating with carbonyl chloride about equal molecular proportions of methylaniline and dimethylaniline dissolved in a liquid aromatic hydrocarbon, while maintaining the solution at a temperature of about 60° C.

18. The process of producing dimethyldiphenylurea which comprises treating with carbonyl chloride about equal molecular proportions of methylaniline and dimethylaniline dissolved in benzene, while maintaining the solution at a temperature of about 60° C.

19. The process of producing dimethyldiphenylurea which comprises passing carbonyl chloride into a solution heated to about 60° C. and containing one part of methylaniline, between one and two parts of dimethylaniline, and about one part of benzene until practically all evidence of reaction has ceased, distilling off the benzene, and washing the residue with dilute hydrochloric acid to remove dimethylaniline hydrochloride.

20. The process of producing tetra-substituted ureas which comprises treating a secondary alkyl-aryl-amine dissolved in an inert organic solvent with carbonyl chloride in the presence of a basic material which is soluble in the solvent used and is capable of combining with the hydrogen chloride formed during the reaction.

21. The process of producing tetra-substituted ureas which comprises inducing a reaction between a secondary amine, having an amino group attached to two hydrocarbon radicals, and carbonyl chloride in the presence of a sufficient quantity of a tertiary amine to react with substantially all of the hydrogen chloride formed during the reaction, said reaction being brought about in the presence of an inert organic solvent for the amines.

In testimony that I claim the foregoing I have hereunto set my hand.

ARTHUR P. TANBERG.

Witnesses:
 HERBERT WINKEL,
 R. L. ANDREWS.

Certificate of Correction.

It is hereby certified that in Letters Patent No. 1,437,027, granted November 28, 1922, upon the application of Arthur P. Tanberg, of Wilmington, Delaware, for an improvement in "Processes of Producing Tetra-Substituted Ureas," an error appears in the printed specification requiring correction as follows: Page 2, line 113, for the word "benzine" read *benzene;* and that the said Letters Patent should be read with this correction therein that the same may conform to the record of the case in the Patent Office.

Signed and sealed this 9th day of January, A. D., 1923.

[SEAL.]
                                      KARL FENNING,

*Acting Commissioner of Patents.*